United States Patent [19]
Wolfe

[11] Patent Number: 5,521,765
[45] Date of Patent: May 28, 1996

[54] ELECTRICALLY-CONDUCTIVE, CONTRAST-SELECTABLE, CONTRAST-IMPROVING FILTER

[75] Inventor: Jesse D. Wolfe, San Ramon, Calif.

[73] Assignee: The BOC Group, Inc., New Providence, N.J.

[21] Appl. No.: 271,822

[22] Filed: Jul. 7, 1994

[51] Int. Cl.$^6$ .............................. G02B 5/22; G02B 1/10; F21V 9/04; B05D 5/06
[52] U.S. Cl. .................. 359/885; 359/585; 359/586; 359/588; 359/359; 359/360; 427/166
[58] Field of Search .................... 359/359, 360, 359/361, 585, 586, 588, 589, 590, 884, 885; 204/192.23; 428/213, 336; 427/166

[56] References Cited

U.S. PATENT DOCUMENTS

| | | | |
|---|---|---|---|
| 3,682,528 | 8/1972 | Apfel et al. | 359/360 |
| 4,179,181 | 12/1979 | Chang | 359/589 |
| 4,846,551 | 7/1989 | Rancourt et al. | 359/589 |
| 4,859,532 | 8/1989 | Oyama et al. | 428/336 |
| 4,960,310 | 10/1990 | Cushing | 359/585 |
| 4,965,121 | 10/1990 | Young et al. | 428/213 |
| 5,047,131 | 9/1991 | Wolfe et al. | 204/192.23 |
| 5,344,718 | 9/1994 | Hartig et al. | 428/623 |
| 5,377,045 | 12/1994 | Wolfe et al. | 359/585 |

FOREIGN PATENT DOCUMENTS

WO9202364 2/1992 WIPO.

OTHER PUBLICATIONS

Thornton, John A., et al.; "Internal Stresses in Metallic Films Deposited by Cylindrical Magnetron Sputtering"; *Thin Solid Films*, 64; 1979; pp. 111–119.

Belkind, A., et al.; "Reactive co–sputtering of oxides and nitrides using a C–mag™ rotatable cylindrical cathode"; *Surface and Coatings Technology*, 49; 1991; pp. 155–160.

Wolfe, Jess, et al.; "Durable Sputtered Low Emissivity Coatings"; *2nd Coating Technology Symposium;* undated; pp. 11:1–11:17.

*Primary Examiner*—Paul M. Dzierzynski
*Assistant Examiner*—Audrey Chang
*Attorney, Agent, or Firm*—David A. Draegert; Salvatore P. Pace

[57] ABSTRACT

The present invention comprises a contrast-improving filter which uses a tri-layer comprising a metal layer, preferably silver, sandwiched between two metal precoat layers. The silver layer is thin so that it is substantially transparent to visible light. Additionally, the contrast-improving filter uses a silicon nitride layer between the tri-layer and further oxide layer to improve the durability and scratch-resistance of the contrast-improving filter.

27 Claims, 7 Drawing Sheets

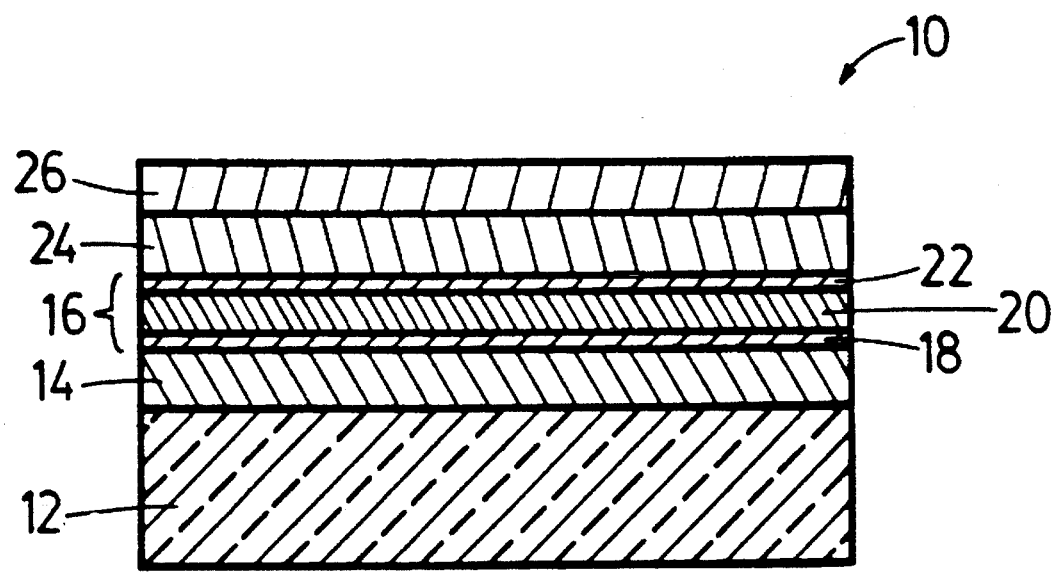
FIG._1.

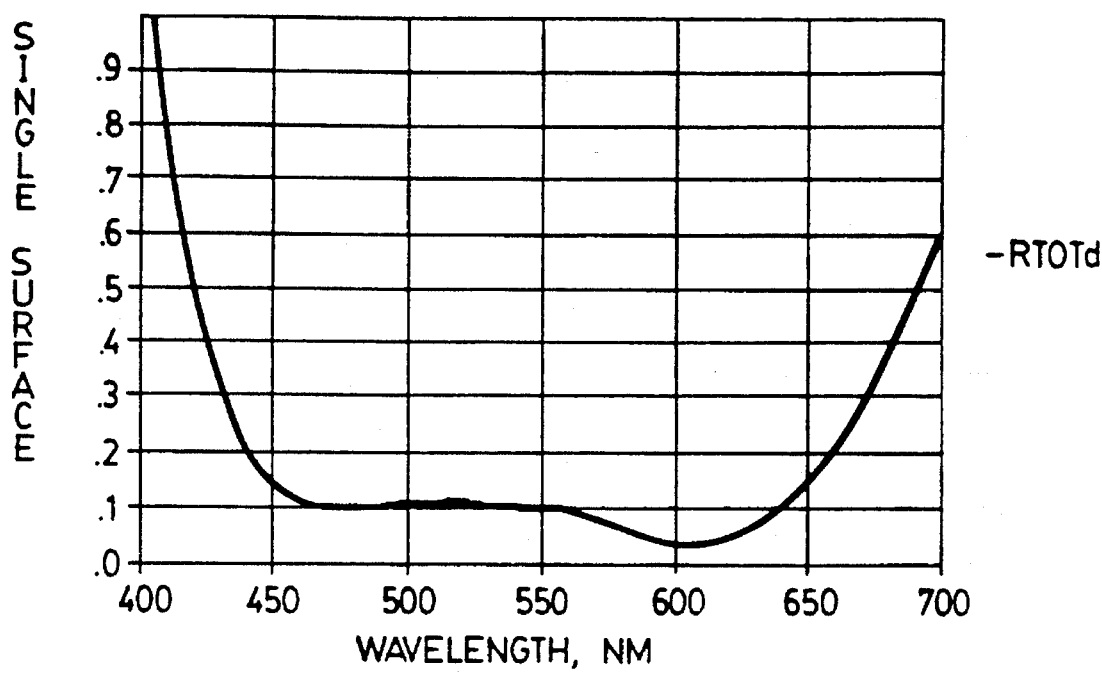
FIG._2.
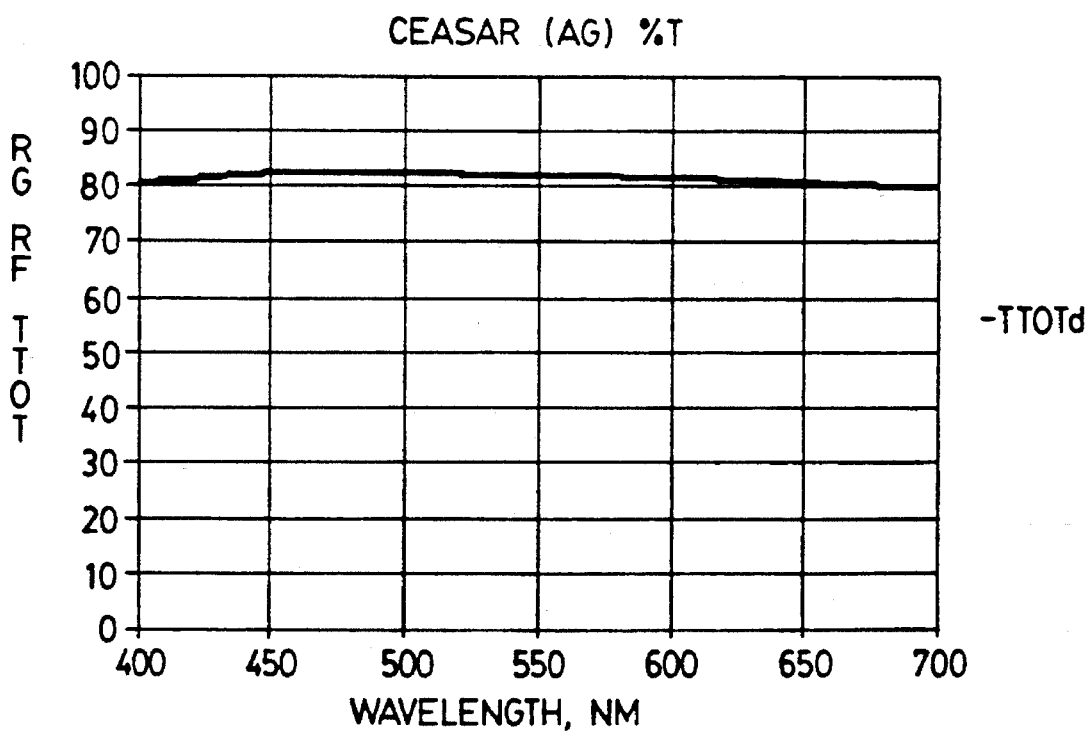
FIG._3.

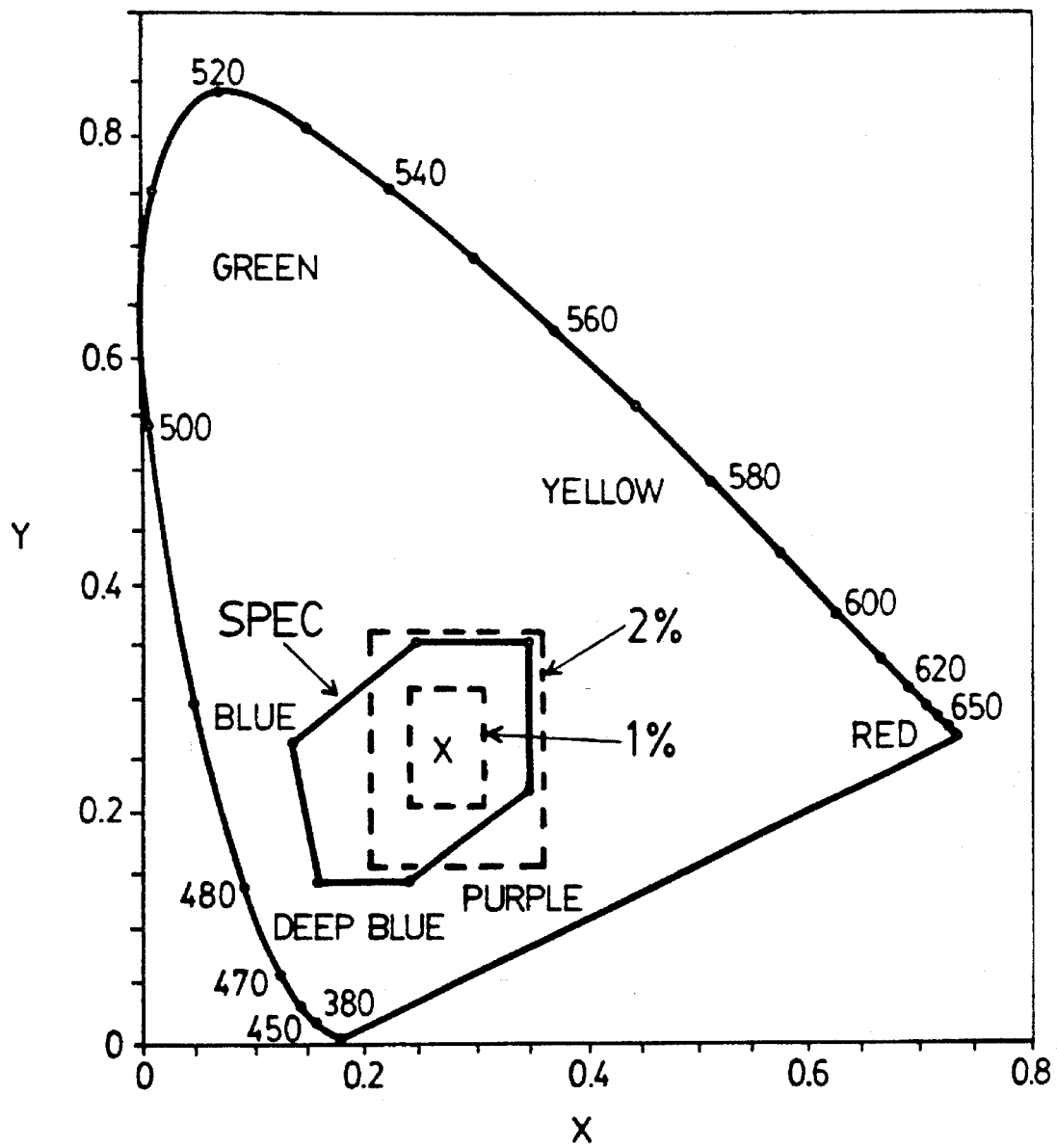
FIG._4.

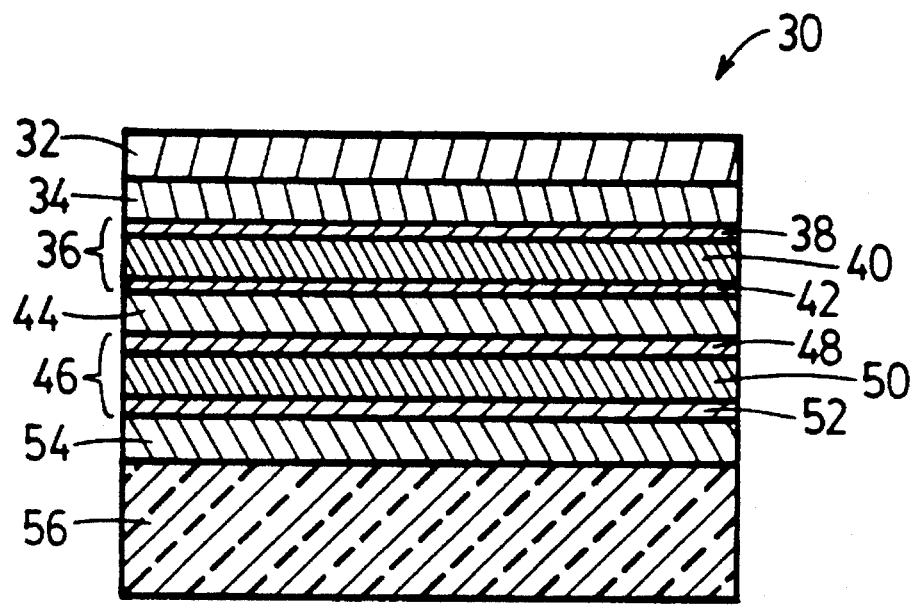
FIG._5.
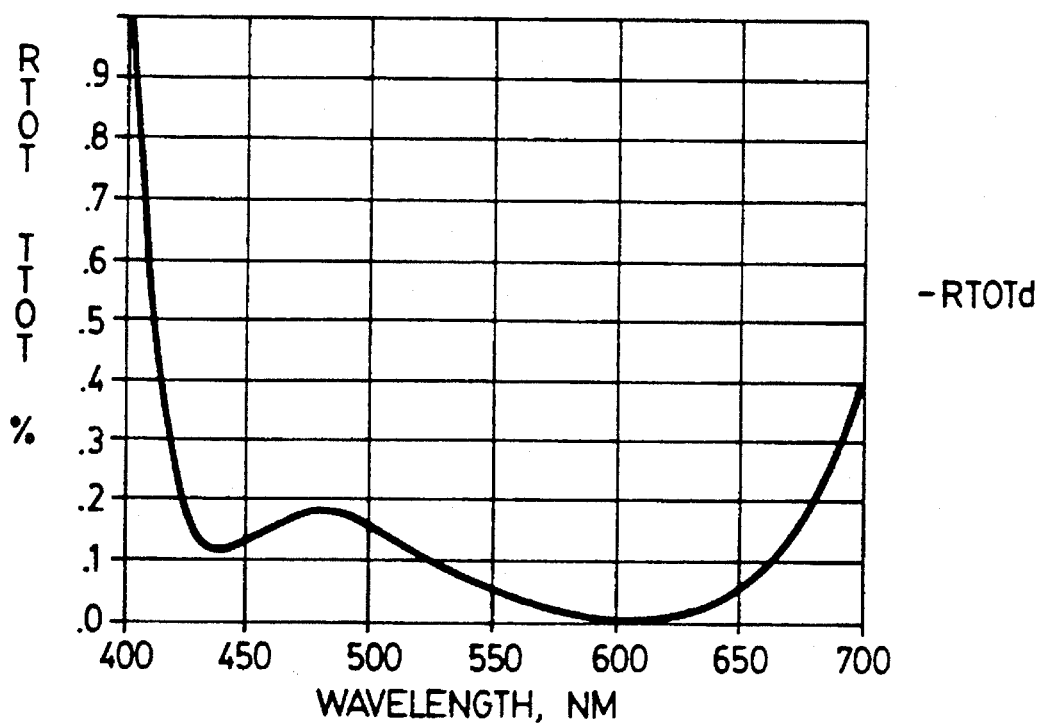
FIG._6.

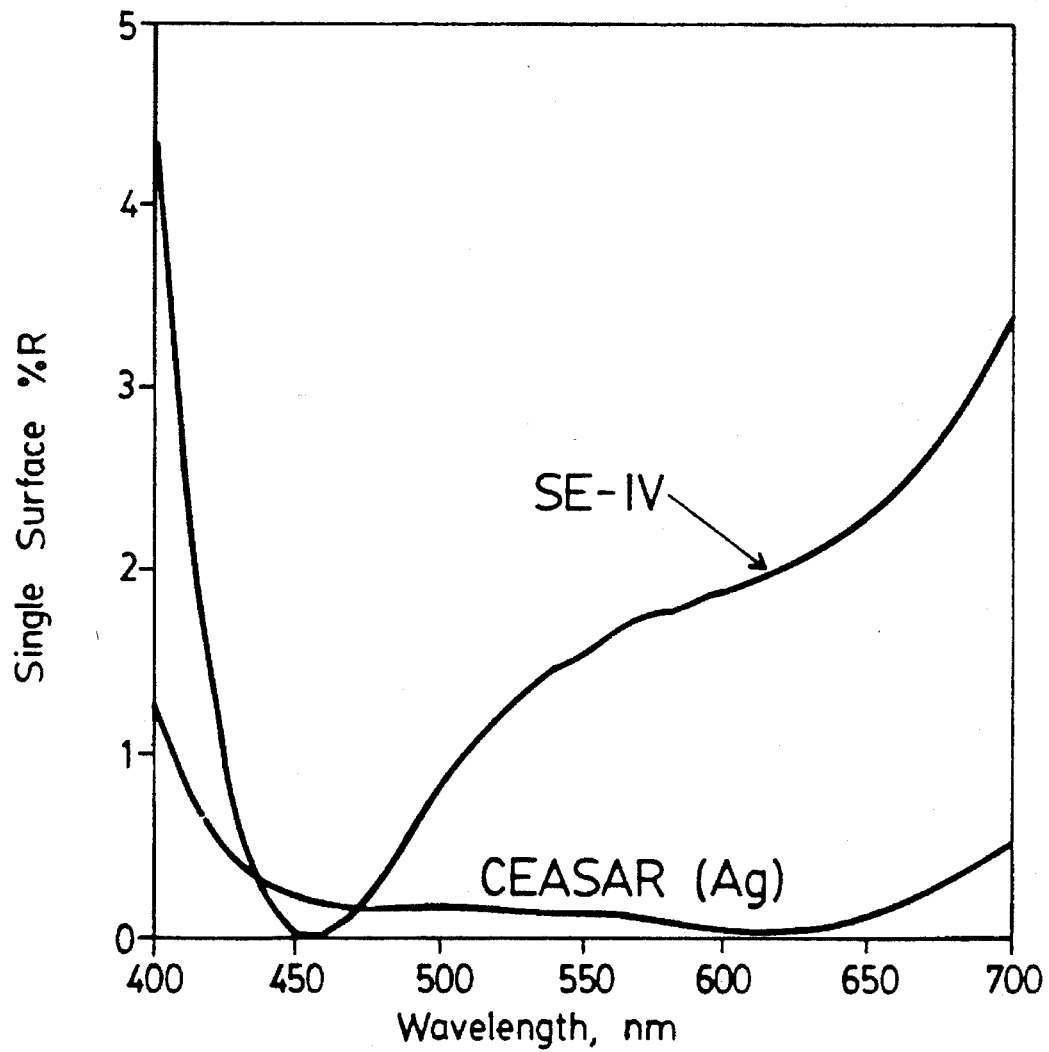
FIG._7.

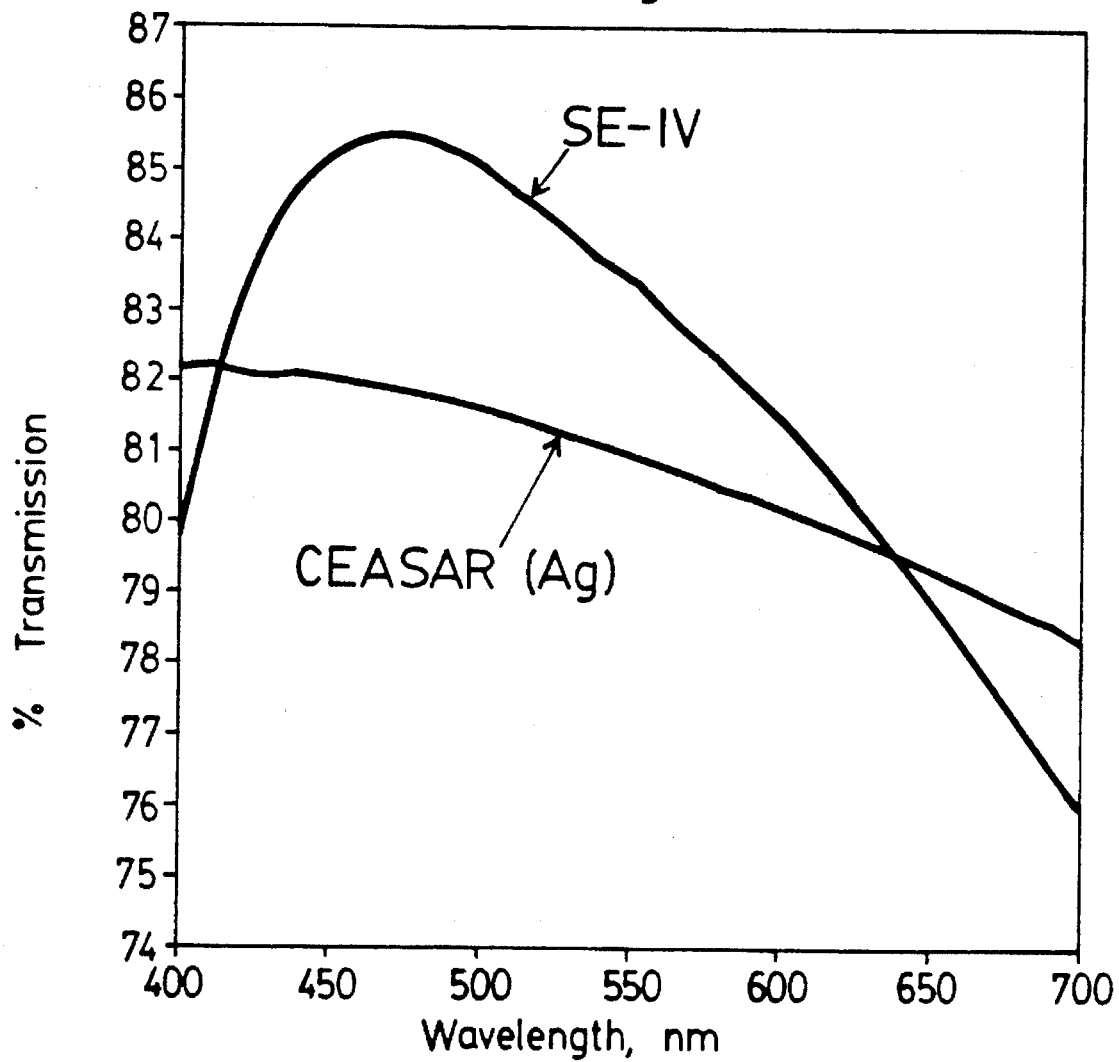
FIG._8.

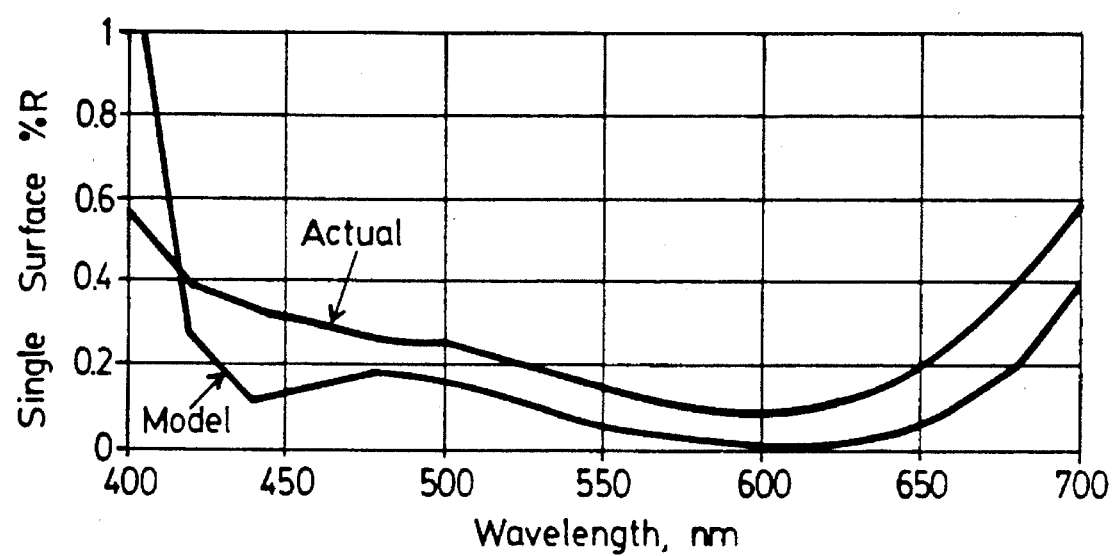
FIG._9.

ELECTRICALLY-CONDUCTIVE, CONTRAST-SELECTABLE, CONTRAST-IMPROVING FILTER

BACKGROUND OF THE INVENTION

The present invention relates to electrically-conductive contrast-improving (CI) filters made of multi-layer thin film coatings. Contrast-improving filters are often used to enhance the image contrast and reduce glare from the screen of a video display terminal or a television set. The screen can be a cathode ray tube (CRT), a flat panel display screen or other type of video display device. The CI filter can be placed between the viewer or operator and the screen, or can be directly coated on the screen itself.

The contrast improvement is accomplished by introducing optical absorption between the viewer and the screen. This absorption improves the contrast between the video image created on the screen and the reflected extraneous light. In the case of a contrast-improving filter between the observer and the screen, the light from the video image is transmitted out through the contrast-improving filter and is attenuated by virtue of the absorption of the contrast-improving filter. However, extraneous light from windows or room lights which would ordinarily reflect from the screen and reduce the contrast of the video image must pass through the CI filter twice-once traveling from the light source to the screen, and then again after reflection from the screen to the observer. Because of the absorption in the contrast-improving filter, the extraneous light is attenuated twice and its intensity is reduced by the square of the transmission of the filter, while the light from the video image is only attenuated once. For example, assuming little or no single surface reflectance for the contrast-improving filter, if the contrast-improving filter has a transmission of about 40%, the video image would be reduced to 40% of its original intensity, but the extraneous light would be reduced to 16% of its original intensity because of the double pass through the CI filter.

The glare reduction feature of the contrast-improving filter is accomplished by reducing the single surface reflectance of the surface of the screen from a value of typically 4% to less than a fraction of a percent. Such a coating is typically called an anti-reflection (AR) coating.

A third desirable property of the contrast-improving filter is that it be electrically conductive. For a modest level of film resistivity (above 10,000 ohms/□), the static charge of the screen will be eliminated and it will not attract dust. For lower resistivity levels (below 60 ohms/□), the film will offer some measure of protection from the effects of electromagnetic interference/radio frequency interference (EMI/RFI).

Glare reduction conductive coatings can be made by incorporating a layer of indium tin oxide (ITO) or similar transparent conductive material into the coating. These coatings must usually be deposited at elevated temperatures to achieve the best properties of the conductive layer.

Alternatively, thin metal layers may be used to provide both the absorption and the conduction required for the filter. The background of Bjornard U.S. Pat. No. 5,091,244 describes an interference filter which includes layers of thin soft metal films such as silver, gold or copper. The metal layers must be thin in order to transmit a sufficient fraction of the visible light. Bjornard states that such layers are not durable, having poor scratch resistance. Additionally, thin films of silver or copper are vulnerable to corrosion and may deteriorate within a few months when used on unprotected surfaces.

Bjornard also discusses the use of titanium nitride to provide conductivity and absorption. However, the absorption in such a film is fairly high (50% or more), and the resistivity is not low enough to provide significant EMI/RFI shielding.

SUMMARY OF THE INVENTION

The present invention uses a thin metal layer sandwiched between a precoat and a postcoat layer and protected from scratching by a protective silicon nitride layer. A low index of refraction material such as a silicon dioxide layer in conjunction with the rest of the design provides the anti-reflection properties needed for the anti-glare feature of the contrast-improving filter. The precoat, postcoat and protective silicon nitride layers protect the metal layer and allow silver to be used as a viable conductive and absorbing layer in the CI filter. Silver is more conductive than titanium nitride by a factor of three, so that improved EMI/RFI shielding is possible. At the same time, the thin silver layer is much less absorbing than the titanium nitride, allowing a designer to select the level of contrast improvement over a much wider range. The maximum transmittance of a CI filter incorporating titanium nitride is about 60%, while a silver-based CI filter can transmit as much as 80%. This feature allows the CI filter designer additional latitude in the design of the system. For example, the thin film layers can be used with a more absorptive substrate. As previously mentioned, a further advantage of silver over some types of CI filter materials is that silver can be deposited without heating the substrate. This is an important consideration if the substrate material is plastic.

In accordance with the principles of the present invention, the above and other objectives are realized by using a thin film contrast-improving filter comprising a transparent substrate; a substantially transparent dielectric layer; a precoat layer; a metal layer, the metal layer being substantially transmissive to visible light; a postcoat layer; a protective substantially transparent dielectric layer comprising silicon nitride; and a low-index substantially transparent dielectric layer, the low-index layer having a lower index of refraction than the protective dielectric layer.

Additionally, the above and other objectives are realized by using a method for the production of a durable thin film contrast-improving filter on a transparent substrate. The method comprises the steps, in sequence, of reactively sputtering a first substantially transparent dielectric layer onto the substrate; depositing a precoat layer; depositing a metal layer to a thickness such that the metal layer is substantially transmissive to visible light; depositing a postcoat layer; reactively sputtering a second substantially transparent protective dielectric layer comprising silicon nitride onto the second metal precoat layer; and reactively sputtering a substantially transparent low index material onto the second substantially transparent protective dielectric layer, wherein the second substantially transparent protective dielectric layer protects the metal layer when the low index material is sputtered.

BRIEF DESCRIPTION OF THE DRAWINGS

The above and other features and aspects of the present invention will become more apparent upon the reading of the following detailed description in conjunction with the accompanying drawings, in which:

FIG. 1 is a diagram of a thin film contrast-improving filter;

FIG. 2 is a computer generated graph of single-surface reflectance for the contrast-improving filter of a preferred embodiment;

FIG. 3 is a computer generated graph of a one-pass transmission through the thin film layers of the preferred embodiment;

FIG. 4 is a diagram showing the CIE 1964 chromaticity chart showing a typical specification in terms of the required area in the chart within which the color of the light reflected from the contrast-improving filter must be kept, and boxes showing the area within the CIE chart where the reflection from the contrast-improving filter is found for a given thickness variation of all the layers;

FIG. 5 is a diagram of a ten-layer thin film contrast-improving filter of an alternate embodiment;

FIG. 6 is a computer generated graph of single-surface reflectance for the contrast-improving filter of the alternate embodiment of FIG. 5;

FIG. 7 is a graph of single-surface reflectance of a six-layer design of the present invention compared to a low-emissivity design with no silicon dioxide layer;

FIG. 8 is a graph of the overall transmission of a six-layer design of the present invention compared to a low-emissivity filter with no silicon dioxide layer; and FIG. 9 is a graph of the single surface reflectance of a computer-generated model and an actual test sample of an alternate six-layer design.

DETAILED DESCRIPTION OF THE INVENTION

FIG. 1 is a diagram of a contrast-improving filter 10 of the present invention. The thin film contrast-improving filter 10 includes a transparent glass substrate 12, a transparent dielectric layer 14, and a tri-layer 16. The tri-layer 16 comprises a precoat layer 18, a substantially-transparent metal layer 20, and a postcoat layer 22. An additional protective transparent dielectric layer 24 is placed on top of the tri-layer 16. The transparent protective dielectric layer 24 comprises silicon nitride so as to protect the tri-layer 16. Dielectric layer 26 is a low index of refraction (low-index) material which completes the anti-reflection coating for the contrast-improving filter 10. The dielectric layer 26 preferably comprises silicon dioxide. Alternately, the dielectric layer 26 could be made of aluminum oxide or a silicon oxide/aluminum oxide mixture.

The transparent substrate 12 can be comprised of materials such as quartz, fused silica, silicate glass, and plastics such as polycarbonates and acrylates. Alternatively, an absorbing substrate such as dyed glass or dyed plastic could be used. The material should be strong so as to support the thin film layers.

Deposited onto the substrate 12 is the first dielectric layer 14. This dielectric layer is preferably silicon nitride. Alternately, as described in Wolfe, et al. U.S. patent application Ser. No. 07/846,224 entitled "Durable Low-Emissivity Solar Control Thin Film Coating," which is incorporated herein by reference, a composite film containing zirconium nitride and silicon nitride could be used. Other suitable dielectric layers include metal oxides such as titanium oxide, tin oxide, zinc oxide, indium oxide which is optionally doped with tin oxide, bismuth oxide, and zirconium oxide. A benefit of using silicon nitride is that all layers can be deposited in nitrogen or a nitrogen/argon mixture except for the top silicon dioxide layer. In the preferred embodiment, the thickness of the first dielectric layer 14 is in the range of 200–500 angstroms. More preferably, this range is from 300–350 angstroms.

The tri-layer 16 includes precoat layer 18 and postcoat layer 22. The precoat and postcoat layers aid in the formation and protection of the metal layer 20. The precoat and postcoat layers are preferably as thin as possible, to minimize absorptive losses. Precoat and postcoat layers can comprise nichrome, which is an alloy of nickel and chromium. This layer can comprise approximately twenty or more percent chromium, with a preferred alloy content of eighty percent nickel and twenty percent chromium. Other metals and alloys that can be used as part of the precoat and postcoat layers include nickel, chromium, rhodium, platinum, tungsten, molybdenum, and tantalum. In the preferred embodiment, the precoat layer is comprised of a mixture of nickel metal and chromium nitride, referred to as $NiCrN_x$. The $NiCrN_x$ layer is preferably eighty percent nickel and twenty percent chromium nitride.

The precoat layer apparently acts as a nucleation layer for the metal layer 20. It is believed that, while the precoat layer is thin enough not to adversely affect the optical properties of the filter, it causes the metal layer 20 to behave as if is were a homogeneous metal slab. The precoat and postcoat layers help protect the metal layer 20, act as glue layers, and help buffer or reduce the stresses in the overall thin-film coating. The precoat and postcoat layers have a thickness in the range of 5–20 angstroms, and preferably 8–16 angstroms, and most preferably have a thickness of substantially 12 angstroms.

Metal layer 20 is substantially transparent to visible light, because of the low value of the thickness selected for the layer. The metal layer 20 has a thickness of 40–150 angstroms, and is preferably below 100 angstroms in thickness. Silver is the preferred metal for the metal layer 20, but other possible metals include gold, copper and platinum. If silver is used for the metal layer 20, it is three times more conductive than the titanium nitride used in the Bjornard, et al. reference, and thus its static electricity dissipating and electromagnetic protection values are greater.

Because of the low value of the thickness chosen for the metal layer 20, the metal layer 20 substantially transmits visible light rather than reflects visible light. This distinguishes the present invention from mirrors such as those described in Wolfe, et al. U.S. patent application Ser. No. 08/054,540 entitled "Durable First and Second Surface Mirrors," which is incorporated herein by reference.

The postcoat layer 22 is placed on top of the metal layer 20. A second dielectric layer 24 comprises silicon nitride. The silicon nitride protects the trilayer 16 such that the filter with the silicon nitride layer will score much higher on the Taber abrasion test than a similar filter without this silicon nitride layer. Additionally, the silicon nitride protects the tri-layer 16 when the silicon dioxide layer 26 is formed. Without the silicon nitride layer 24, the trilayer 16 can be corroded or damaged during the forming of the silicon dioxide layer 26.

The layer 26 is a transparent material with a low index of refraction such that the reflectance of the filter 10 is minimized. The outer low index layer 26 is crucial to the achievement of a broad low reflectance which extends over most of the visible spectrum.

FIG. 7 compares the reflectance of the contrast-improving filter of the present invention with the reflectance of a low-emissivity window coating consisting of a silicon nitride layer, a tri-layer and a second silicon nitride layer, but without an outer silicon dioxide layer. The low-emissivity window coating of FIG. 7 is the Super-E IV design comprising a glass substrate, a titanium oxide (TiO$_2$) layer of 300 Å thick, an NiCrN$_x$ layer of 8 Å thick, a silver layer of 110 Å thick, a second NiCrN$_x$ layer of 8 Å thick, and a SiN$_x$ layer of 420 Å thick. The reflectance of the low-emissivity coating is greater than 1% throughout most of the visible spectrum, while the reflectance of the contrast-improving filter of the present invention is well below 1% over most of the visible spectrum. This improvement is due to the presence of the low index outer layer. It should be noted that the outer low index layer is inappropriate for use on the low emissivity coating. FIG. 8 compares the transmittance of the two coatings. The function of the low-emissivity coating is achieved by maximizing the transmittance through the visible spectrum. The transmittance curve for the contrast-improving filter is seen to be lower than the transmittance of the low-emissivity coating. This difference is predominantly due to the presence of the additional low-index layer in the contrast-improving filter. Thus, the present invention is distinguished from the low-emissivity coating by the presence of the low index layer. Additionally, the preferred thickness of the layers of the low-emissivity coating are different from those of the contrast-improving filter.

In a preferred embodiment, the present invention includes a six-layer film of the design, a glass substrate 12, the first dielectric layer 14 comprising silicon nitride, a NiCrN$_x$ precoat layer, a silver metal layer 20, a NiCrN$_x$ postcoat layer, the second dielectric layer 24 comprising silicon nitride, and the silicon dioxide layer 26. The thicknesses of these layers in a preferred embodiment are:

TABLE I

| Air | SiO$_2$ | SiN$_x$ | NiCrN$_x$ | Ag | NiCrN$_x$ | SiN$_x$ | Glass |
|---|---|---|---|---|---|---|---|
| | 575Å | 185Å | 12Å | 75Å | 12Å | 300Å | |

The thicknesses of the thin films shown in FIG. 1 are not to scale. The film of Table I has greater than 75% visible transmission, less than 0.5% visible reflectance, and an electrical conductance of less than 50 Ω/□. This design also passes all Mil-spec C-14806A environmental tests. The film has an emissivity of less than 0.3 and could be used on the inner surfaces of an insulated glass unit as a low emissivity coating. Unlike the titanium nitride filter of Bjornard, et al., the filter of the preferred embodiment has a low enough resistance to be considered to be in the minimum shielding range (6–60 Ω/□) for Electro-Magnetic (EMI) and Radio Frequency interference (RFI).

If lower transmission is needed, the thicknesses of the NiCrN$_x$ layers can be increased or the first layer next to the substrate can be replaced by nickel oxide or a mixture of silicon nitride and nickel. Alternately, the 10-layer design discussed below can be used.

Another way of reducing the transmittance of the contrast-improving filter is to replace the silver layer with a layer of a less transparent metal such as nickel. The six-layer design has the advantage that the transmission level in the current patent can be as high as 80%. This gives the system designer the opportunity to select the transmittance from a greater range of values than was previously possible. This is the significance of the phrase "selectable contrast" in the name of the patent. Previous contrast-improving filters based on absorbing conductive layers are restricted to lower transmission levels (below 60%), and thus are more limited in the range of contrast improvement values that they can achieve.

The method of forming the contrast-improving filter of the preferred embodiment is as follows. All of the layers are deposited by DC magnetron sputtering. The powers given below are for an in-line sputtering system. The thicknesses of the thin-coat layers can be determined by adjusting the DC power of the power supply for the target. The line speed of the substrates passing through the sputtering chambers also affects the thicknesses of the thin-coat layers formed.

The first dielectric layer 14 comprises silicon nitride, which is formed by sputtering silicon in a nitrogen gas containing environment. In a preferred embodiment, a cylindrical silicon target is doped with a small amount of metal so that it can be sputtered from a cylindrical C-MAG™ device, which is available from Airco Coating Technology of Concord, Calif. This C-MAG™ device is described in Wolfe, et al. U.S. Pat. No. 5,047,131 entitled "Method for Coating Substrates With Silicon-Based Compounds," which is incorporated herein by reference. The first silicon nitride layer can be formed by supplying 20 kilowatts of power in 3 millitorr of 100% nitrogen. Precoat layer 18 and postcoat layer 22 are formed by sputtering from a nickel/chrome alloy target in a nitrogen gas containing atmosphere to form a mixture of nickel and chromium nitride. The precoat and postcoat layers can be formed by supplying 8 kilowatts of power in 3 millitorr of 100% nitrogen or 50% argon, 50% nitrogen. Alternately, two separate targets, a nickel target and a chromium target, could be co-sputtered in a nitrogen environment to form the NiCrN$_x$ precoat and postcoat layers. The relative amounts of nickel and chromium sputtered can be determined by the relative DC power supplied to the targets. The silver layer 20 can be deposited from a silver target with 3 kilowatts of power in 3 millitorr of argon or 50% argon, 50% nitrogen. The second silicon nitride layer is sputtered in a manner similar to the first. The silicon dioxide layer 26 can be formed with the use of a C-MAG™ rotatable cathode in a 100% oxygen gas environment at a pressure of 3 millitorr with 20 kilowatts per cathode.

As shown above in the preferred embodiment, only one change from a nitrogen sputtering environment to an oxygen sputtering environment is required. In an in-line sputtering system, the transitions from a nitrogen environment to an oxygen environment can harm the process control of the filter. Unless costly precautions such as high-efficiency pumps or shielding placed near the glass are used, some of the oxygen can escape into a nitrogen sputtering chamber and vice versa. This can cause impurities in the thin film layers. The present design requires these costly precautions only once at the transition from forming silicon nitride to forming silicon dioxide. The contrast-improving filter using titanium nitride layers discussed in Bjornard has three transitions between nitrogen environment sputtering processes and oxygen environment sputtering processes, thus complicating the process and/or the equipment.

FIG. 2 is a computer-generated graph showing the percentage reflectance from the contrast-improving filter of the preferred embodiment, with the composition discussed in Table I. Note that the reflectance value is below 0.2 percent for the range of 440–660 nanometers. Typically, a contrast-improving filter is required to have a reflectance below a certain percentage for a wavelength range, and an average for the range below another value. The contrast-improving filter of the present invention has its reflectance below 0.6% for all wavelengths within the range 430–660 nm, and has an average reflectance value less than 0.3% for this wavelength range. Note that the silicon dioxide layer is crucial to get the required low reflectance.

FIG. 3 is a chart showing the total transmission through the multilayer filter of the present invention for the visible wavelength range. Note that the total transmission is around 80% over the visible wavelength range. The transmission through the filter of the present invention can be much greater than the transmission through the contrast-improving filter of the Bjornard et al. patent. The potentially high transmission value of the present invention gives the system designer a greater range of flexibility in selecting the degree of contrast improvement than is possible with the contrast-improving filter of the Bjornard et al. patent. The present CI filter can be used to advantage with glass substrates having various levels of absorption. As an example, suppose the desired transmittance level for the filter is 40%. This could be achieved by putting a CI filter with 40% transmittance on absorption-free glass, by putting a CI filter with 50% transmittance on glass with 80% transmittance (0.5×0.8=0.4), or by putting a CI filter with 80% transmittance on glass with 50% transmittance. As indicated, the total contrast improvement is due to the product of the transmittance of the coating and the transmittance of the glass. Using prior technology, the CI filter would be restricted to use on glass with an 80% transmittance or more, while the present invention allows the selection of transmission values from 50%–100% for the glass. An advantage of a CI filter with 80% transmittance in the coating and 50% in the glass is that scratches to the coating will be less visible, since most of the absorption is in the glass. By comparison, if the CI filter had 40% transmission in the coating and 100% transmission in the glass and the coating were scratched, there would be no absorption where the scratch was and the video image would appear very bright at the location of the scratch.

In a preferred embodiment, the thickness of the thin film coatings and the light transmission in the substrate are such that the light transmission through the contrast-improving filter is about 20–40%, preferably about 30%, and substantially uniform through the range of 430–660 nanometers.

The variations in the thicknesses of the preferred embodiment can affect the performance of the filter. Most noticeably, the variations in the thicknesses of the thin-film layers will affect the filter's ability to meet the color requirements.

FIG. 4 is a CIE 1964 chromaticity diagram showing a typical specification for the required area in the chart within which the reflected light from a CI filter must be kept. FIG. 4 assumes a zero degree incidence angle on the filter with an illuminant-F light source and a 10-degree standard observer. The specified area on the color chart corresponds to neutral and slightly bluish colors. The reflected light from the CI filter of Table I lies on the x within the specified area. If the thickness of each of the layers of the filter is allowed to vary randomly by any amount up to +/−1%, the color of the reflected light will change slightly, but will lie within the dashed box labeled 1% in FIG. 4. A larger box contains the color variations corresponding to 2% random variations in the layer thicknesses. It can be seen from the figure that the 1% variations are assured to be within the specification, but the 2% variations are not.

FIG. 5 is a diagram of a contrast-improving filter 30 of an alternate embodiment. The contrast-improving filter 30 includes additional thin layers. FIG. 5 includes the first transparent dielectric layer 54, the tri-layer 46 comprising a precoat layer 52 and a transparent metal layer 50, and a postcoat layer 48. FIG. 5 also includes a protective transparent dielectric layer 34, preferably silicon nitride, and a final low index layer 32. In addition to these layers, FIG. 5 also contains an additional transparent dielectric layer 44 and a second tri-layer 36 comprising an additional precoat layer 42, an additional transparent metal layer 40 and an additional postcoat layer 38. The layers of the contrast-improving filter 30 are preferably similar to that of the contrast-improving filter 10 shown in FIG. 1, but an additional tri-layer and dielectric layer are used.

In the preferred embodiment of this ten-layer design, the thicknesses are:

TABLE II

| Air | $SiO_2$ | $SiN_x$ | $NiCrN_x$ | Ag | $NiCrN_x$ |
|---|---|---|---|---|---|
| | 530Å | 190Å | 12Å | 81Å | 12Å |
| $NiCrN_x$ | Ag | $NiCrN_x$ | $SiN_x$ | Glass | |
| 12Å | 66Å | 12Å | 340Å | | |

The ten-layer design of Table II has about a 65% transmission and a sheet resistance of about 5.0 $\Omega/\square$.

FIG. 6 is a computer-generated graph of single-surface reflectance for the contrast-improving filter of the alternate embodiment of Table II. Note that the single-surface reflectance is less than 0.2% from 425 nm to 680 nm.

An alternate six-layer design is shown in Table III.

TABLE III

| Air | $SiO_2$ | $SiN_x$ | $NiCrN_x$ | Ag | $NiCrN_x$ | $SiN_x$ | Glass |
|---|---|---|---|---|---|---|---|
| | 565Å | 200Å | 12Å | 75Å | 12Å | 305Å | |

In the design of Table III, the silicon nitride layer next to the silicon dioxide layer is 200 Å thick. It is preferable that this silicon nitride layer be as thick as possible to increase the mechanical durability of the filter. Additionally, this silicon nitride layer needs to be at least 30 Å thick to protect the tri-layer during the forming of the silicon dioxide layer. FIG. 9 is a graph of the single surface reflectance of a computer-generated model and an actual test sample of this alternate six-layer design.

Test samples of the six-layer design of Table III have passed 72 hours in salt fog even in areas where the coating was scratched with a diamond scribe. The films also passed a one-hour boil in 20% NaCl in $H_2O$, 500 eraser rub, and scored greater than 8.5 on the Taber abrader test. The films will pass all Mil Spec C-14806A tests.

Various details of the implementation and method are merely illustrative of the invention. It will be understood that various changes in details may be within the scope of the invention, which is to be limited only by the appended claims. For example, the thin film layer can be directly formed on the CRT tubes to provide contrast improvement.

What is claimed:

1. A thin film contrast-improving filter, comprising:

a transparent substrate;

a substantially transparent dielectric layer;

a precoat layer;

a metal layer consisting essentially of at least one metal selected from the group consisting of silver, gold, copper platinum, and alloys of these metals, said metal layer being substantially transmissive to visible light;

a postcoat layer;

a protective substantially transparent dielectric layer comprising silicon nitride; and a low-index, substantially-transparent, dielectric layer, the low-index layer having a lower index of refraction than the protective dielectric layer, wherein each of the postcoat and precoat layers has a thickness of 8 Å or more and is formed from a mixture of nickel metal and at least one of chromium and chromium nitride, the precoat and postcoat layers having a combined thickness of 24 Å or more.

2. The thin film contrast-improving filter of claim 1, wherein said low-index substantially transparent dielectric layer comprises silicon dioxide.

3. The thin film contrast-improving filter of claim 1, wherein at least one of the precoat or postcoat layers is formed of a mixture of nickel metal and chromium nitride.

4. The thin film contrast-improving filter of claim 1, wherein at least one of the precoat or postcoat layers is formed of nichrome.

5. The thin film contrast-improving filter of claim 1, wherein said metal layer is formed of silver.

6. The thin film contrast-improving filter of claim 5, wherein the thickness of said metal layer is less than 100 angstroms.

7. The thin film contrast-improving filter of claim 1, wherein the substantially transparent dielectric layer, the precoat layer, the metal layer, the postcoat layer, the protective dielectric layer and the low-index dielectric layer have thickness such that these thin film layers have a transmission of visible light greater than 70%.

8. The thin film contrast-improving filter of claim 7, wherein the thin film layers have a transmission of visible light of about 80%.

9. The thin film contrast-improving filter of claim 1, wherein the substrate comprises a substrate having a transmission of visible light less than 80%.

10. The thin film contrast-improving filter of claim 9, wherein said substrate has a transmission of visible light of about 60%.

11. The thin film contrast-improving filter of claim 1 further comprising, located between the postcoat layer and the protective dielectric layer, an additional substantially transparent dielectric layer, an additional precoat layer, an additional metal layer and an additional postcoat layer.

12. The thin film contrast-improving filter of claim 1, wherein:

the transparent substrate has a transmission of visible light less than 80%;

the metal layer is comprised of silver; and the low-index layer is formed in an oxygen environment, wherein the silicon nitride layer is of a thickness sufficient to protect the silver layer from the oxygen environment used to form the low-index layer and wherein the thicknesses of the thin film layers are such that the thin film layers have a transmission of visible light greater than 50% and the single surface reflectance of the contrast-improving filter is less than 1% over a substantial portion of the visible spectrum.

13. The thin film contrast-improving filter of claim 12, wherein the low-index layer comprises a silicon dioxide layer.

14. The thin film contrast-improving filter of claim 12, wherein said substrate has a transmission of visible light in the range of 30% to 70%.

15. The thin film contrast-improving filter of claim 14, wherein said substrate has a transmission of visible light of about 50%.

16. The thin film contrast-improving filter of claim 12, wherein the protective silicon nitride layer has a thickness greater than 100 Angstroms.

17. The thin film contrast-improving filter of claim 16, wherein the protective silicon nitride layer has a thickness of about 200 Angstroms.

18. The thin film contrast-improving filter of claim 12, wherein the total light transmission through the contrast-improving filter is about 20–40% and substantially uniform through the range of 430–660 nanometers.

19. The thin film contrast-improving filter of claim 18, wherein the total light transmission through the contrast-improving filter is about 30% and substantially uniform through the range of 430–660 nanometers.

20. The thin film contrast-improving filter of claim 12, wherein the substrate is a dyed glass substrate.

21. A method for the production of a durable thin film contrast-improving filter on a transparent substrate, comprising the steps, in sequence, of:

reactively sputtering a first substantially transparent dielectric layer onto said substrate;

depositing a precoat layer;

depositing a metal layer to a thickness such that the metal layer is substantially transmissive to visible light;

depositing a postcoat layer;

reactively sputtering a second substantially transparent protective dielectric layer comprising silicon nitride onto said second metal precoat layer, and reactively sputtering a substantially transparent low index material onto the second substantially transparent protective dielectric layer, wherein said second substantially transparent protective dielectric layer protects the metal layer when the low index material is sputtered, wherein the precoat and postcoat layers are formed by sputtering nickel and chromium in a nitrogen environment to form a mixture of nickel metal and chromium nitride.

22. The method for the production of a durable thin film contrast-improving filter as defined in claim 21, wherein the step of reactively sputtering the second dielectric layer comprises:

(a) providing a cylindrical magnetron that is coated with a target material comprising silicon; and (b) reactively sputtering in an atmosphere containing nitrogen so that the second dielectric layer comprises silicon nitride.

23. The method for the production of a durable thin film contrast-improving filter as defined in claim 21, wherein the step of reactively sputtering the low index layer comprises:

(a) providing a cylindrical magnetron that is coated with a target material comprising silicon; and (b) reactively sputtering in an atmosphere containing oxygen so that the low-index layer comprises silicon dioxide.

24. A thin film contrast-improving filter, comprising:

a transparent substrate;

a substantially transparent dielectric layer;

a precoat layer;

a metal layer formed from a metal selected from the group consisting of silver, gold, copper, and platinum, said metal layer being substantially transmissive to visible light;

a postcoat layer;

a protective substantially transparent dielectric layer comprising silicon nitride; and a low-index, substantially-transparent, dielectric layer, the low-index layer having a lower index of refraction than the protective dielectric layer, wherein the precoat and postcoat layer are formed of a mixture of nickel metal and chromium nitride.

25. The thin film contrast-improving filter of claim 24, wherein said precoat and said postcoat layers have a combined thickness of 24 Å or more.

26. A method for the production of a durable thin film contrast-improving filter on a transparent substrate, comprising the steps, in sequence, of:

reactively sputtering a first substantially transparent dielectric layer onto said substrate;

depositing a precoat layer;

depositing a metal layer to a thickness such that the metal layer is substantially transmissive to visible light;

depositing a postcoat layer;

reactively sputtering a second substantially transparent protective dielectric layer comprising silicon nitride onto said second metal precoat layer, and reactively sputtering a substantially transparent low index material onto the second substantially transparent protective dielectric layer, wherein said second substantially transparent protective dielectric layer protects the metal layer when the low index material is sputtered, said steps being such that each of the postcoat and precoat layers is formed with a thickness of 8 Å or more and is formed from a mixture of nickel metal and at least one of chromium and chromium nitride, the precoat and postcoat layers having a combined thickness of 24 Å or more.

27. The method of claim 26, wherein the steps of depositing the precoat and postcoat layers comprise sputtering nickel and chromium in a nitrogen environment to form layers which are a mixture of nickel metal and chromium nitride.

* * * * *